United States Patent Office

3,841,988
Patented Oct. 15, 1974

3,841,988
CONTROL FOR IMPRESSED CURRENT CATHODIC PROTECTION SYSTEMS
James D. Gleason, Cucamonga, Calif., assignor to Lockheed Aircraft Corporation, Burbank, Calif.
Filed Mar. 12, 1973, Ser. No. 339,747
Int. Cl. C23f 13/00
U.S. Cl. 204—196                                      9 Claims

ABSTRACT OF THE DISCLOSURE

A control system for cathodic protection wherein a plurality of modules (local) consisting of an anode, reference cell mounted on a structure to be protected, such as a ship's hull, and associated with a control circuit and rectifier. In addition a remote reference cell and a master controller are employed along with control logic so that when the remote reference cell reading is low the master control provides an "on" signal to the modules. If the reference cell voltage at the module is below a safe limit, a cathodic voltage is supplied by the module. When the safe limit at the module is reached the module turns off.

---

This invention relates to cathodic protection systems and more particularly to a control for such systems.

Cathodic protection for metallic structures located in an electrolyte is well known. This has been accomplished by connecting the metallic structure as a cathode, either by using a so-called "sacrificial" anode or by impressing a D.C. voltage between an anode and the structure such that the latter is cathodic or negative with respect to the anode. In the impressed current systems, a sensing circuit detects (or monitors) the voltage of the structure, and the sensed voltage is then used to control a rectifier to maintain the voltage at the desired level.

While conventional cathodic protection systems have met with considerable success in the protection of ship hulls, piers, pipe lines, etc. against electrolytic (galvanic) corrosion, there are certain problems which are prevalent, not the least of which is caused by the "overprotection" phenomena. Ideally, the cathodic voltage should be the same over the entire metallic structure. As a practical matter, this desired result is not readily attainable. For example, consider cathodic protection of the steel hull of a ship. Different levels of current are required at different speeds of the ship to maintain the desired voltage. In addition, the painted surface of the hull is frequently stripped by mechanical damage in various areas below the water line, resulting in exposed metal surfaces resulting in varying current requirements. Over-protection, caused when the cathodic voltage exceeds the desired level, results in the evolution of gases which further damage the paint.

Thus, it is desirable to regulate the current to provide sufficient protection and yet to avoid excess current levels which tend to damage the paint. At the present time, the reference cells are generally located at a considerable distance from the anodes. Since the hull conditions at the reference cell determine the current requirements, the areas of the hull near the anodes tend to receive excess current as compared to areas of the hull near the reference cell, while more remote areas would receive insufficient current, i.e., underprotected. It would seem obvious that sufficient anodes could be used so that the necessary current could be maintained over the entire underwater hull surface. This might be true for stationary structures such as drilling rigs, piers and the like, but for moving ships this solution is not feasible or practical. For example, varying speed, varying salinity, and other factors must be considered.

Accordingly, it is the principal object of the invention to provide a more uniform protective voltage over the entire ship hull.

A further object of the invention is to provide a cathodic protection system wherein the varying current requirements for various areas of the hull surface are satisfied.

Another object of the invention is to provide a control system for cathodic protection of metallic structures which may include drilling rigs, piers, off-shore platforms, etc., as well as moving ships and the like, against corrosion in an electrolyte.

These and other objects will become apparent from the following description when taken with the drawings, in which.

Briefly, the cathodic protection system in accordance with the invention utilizes a modular concept. Each module consists of an anode, reference cell, rectifier and controller (called local controller, hereinafter). The reference cell senses the condition of the hull (cathode), and if low (less negative) the local controller turns on the rectifier to supply current to the anodes to polarize the hull to the proper potential. Associated with all of the modules is a remote reference cell and a master controller. The master controller applies either on "ON" or "OFF" signal to the local controllers. However, if the local reference senses a potential which exceeds the safe limit, that particular module will not be turned on.

It is well recognized that steel corrodes at less than —600 millivolts and is protected from corrosion at about —800 millivolts, relative to a silver-silver chloride half cell (reference cell). A safe limit, or that voltage at which damage to hull paint and dielectric shields is likely to occur, should be less negative than about 1030 millivolts. In the following discussion, a less negative voltage on the hull cathode will be indicated as a "low" potential, since the voltage sensed by the reference cell (Ag-Ag-Cl) is actually a positive voltage of about 0.5 to 1.1 volts (the hull being negative).

Figure 1:
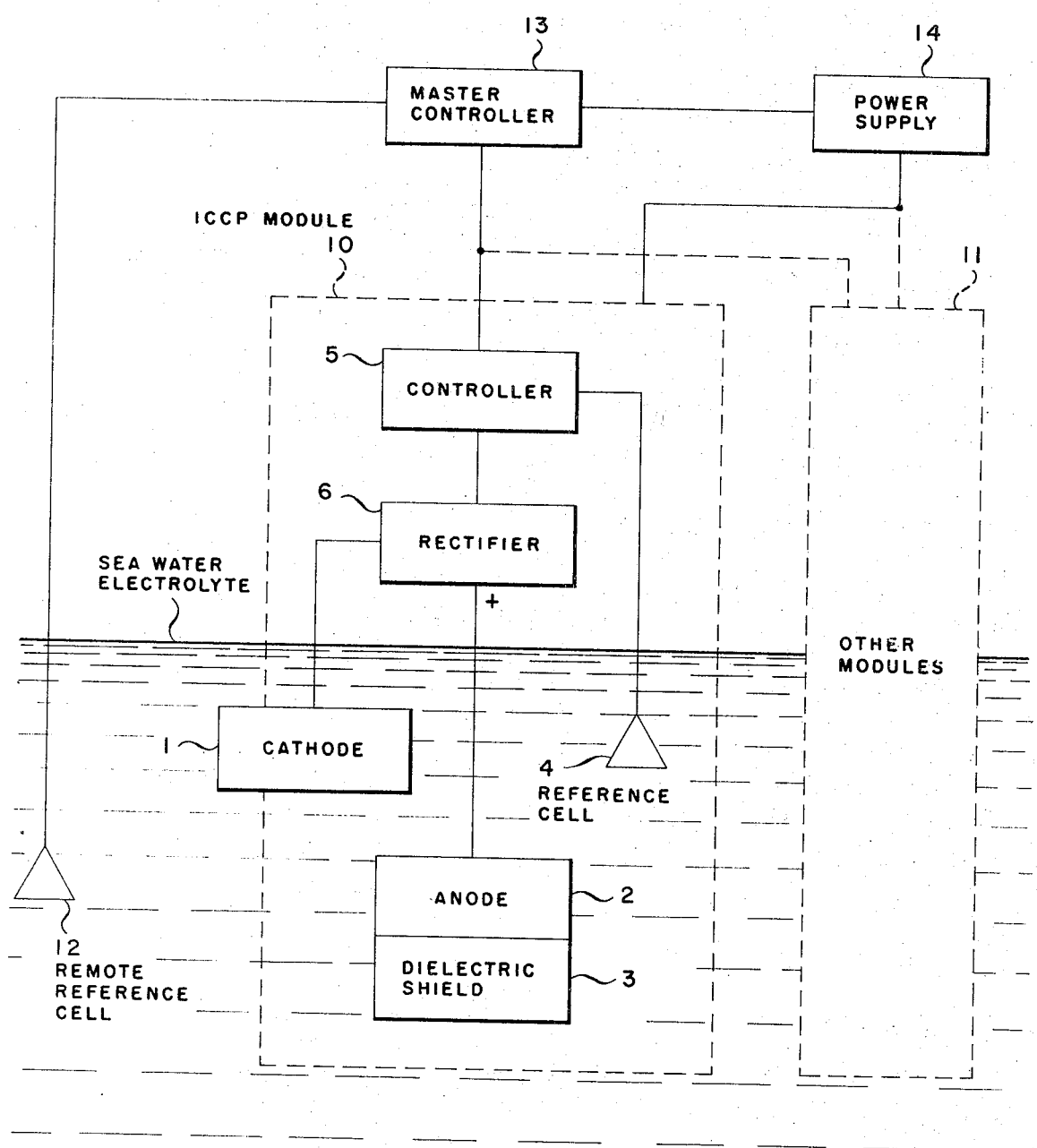
FIG. 1 is a block diagram of a first embodiment of the invention.

Referring now to FIG. 1, the cathode 1 represents any metallic structure to be protected, and for purposes of illustration only will be referred to as a ship hull. Suitably mounted on the hull are a plurality of anodes 2, insulated from the hull; a dielectric shield 3; a reference cell 4 insulated from the hull (cathode) 1 and located adjacent to the anode, for example, on the dielectric shield 3. The output of the reference cell, in this case a silver-silver chloride (Ag-Ag-Cl) half cell, is connected to a controller 5, the output of which controls a rectifier 6. The output of the rectifier is a D.C. voltage, the positive terminal being connected to the anode 2 and the negative being connected to the hull (cathode) 1. The elements thus described are considered a module (enclosed by the broken line 10), and except for differences to be explained may be conventional equipment. Other modules 11 may be suitably located.

Figure 2:
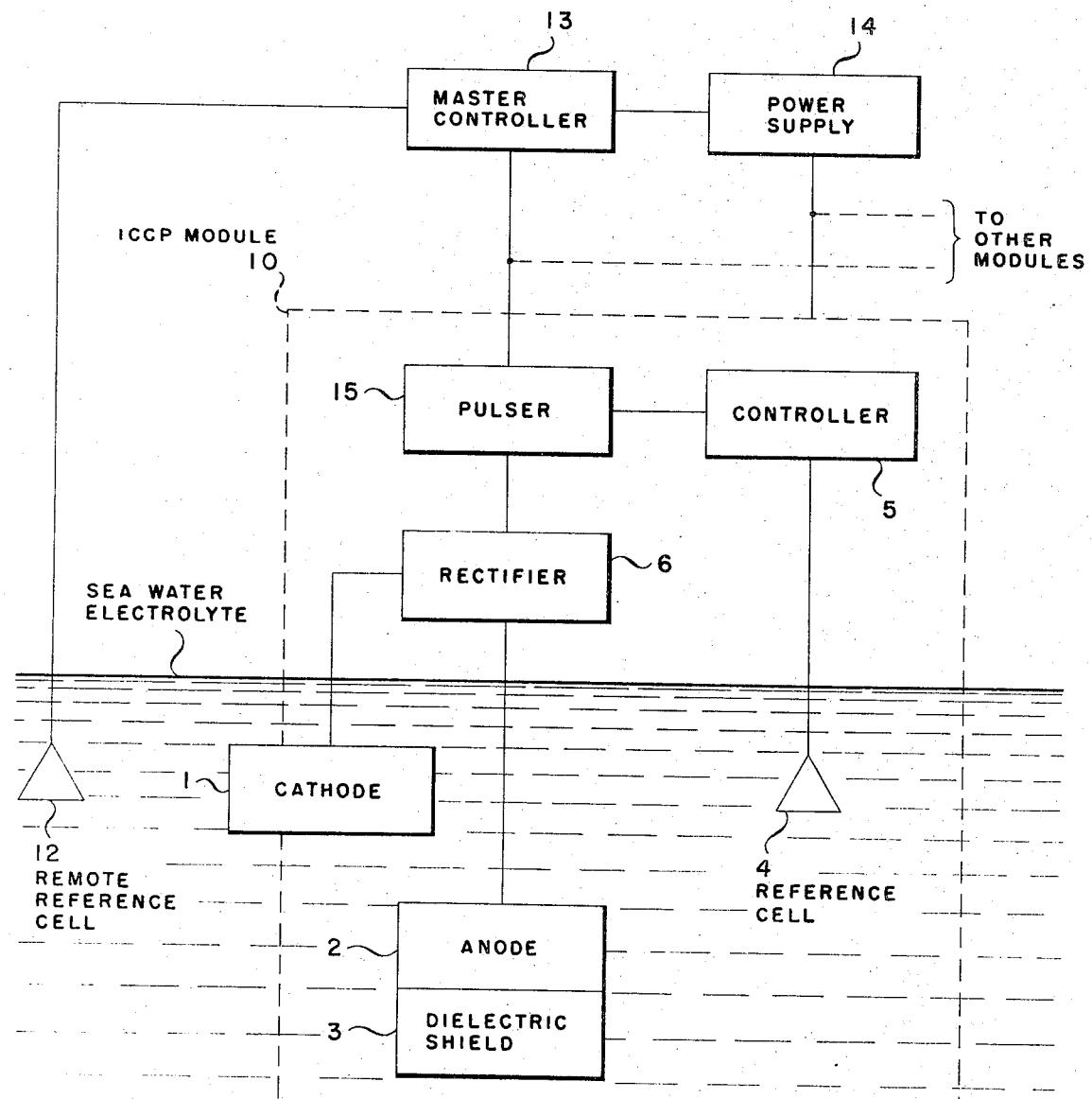
FIG. 2 is a block diagram of a second embodiment of the invention.

A reference cell 12 is remotely located from the anode and is mounted on and insulated from the hull 1. For example, the reference cell 12 may be located in an area of the highest current demand such as in the bow where current demands are high due to dissolved oxygen and where paint damage by the anochor chain is prevalent. The output of the remote reference cell is connected to a master controller 13, the output of which is connected to the controllers (5) of each module. A power supply 14 is connected to the master controller and all the modules. FIG. 2 is similar to FIG. 1 except that the outputs of the local controller 5 and master controller 13 are connected to a pulser network 15 which is in turn connected to the rectifier 6. It is to be understood that the reference cells, anodes and the hull (cathode) in both FIGS. 1 and 2 are located in the seawater electrolyte, i.e., below the water line, as indicated.

Figure 3:
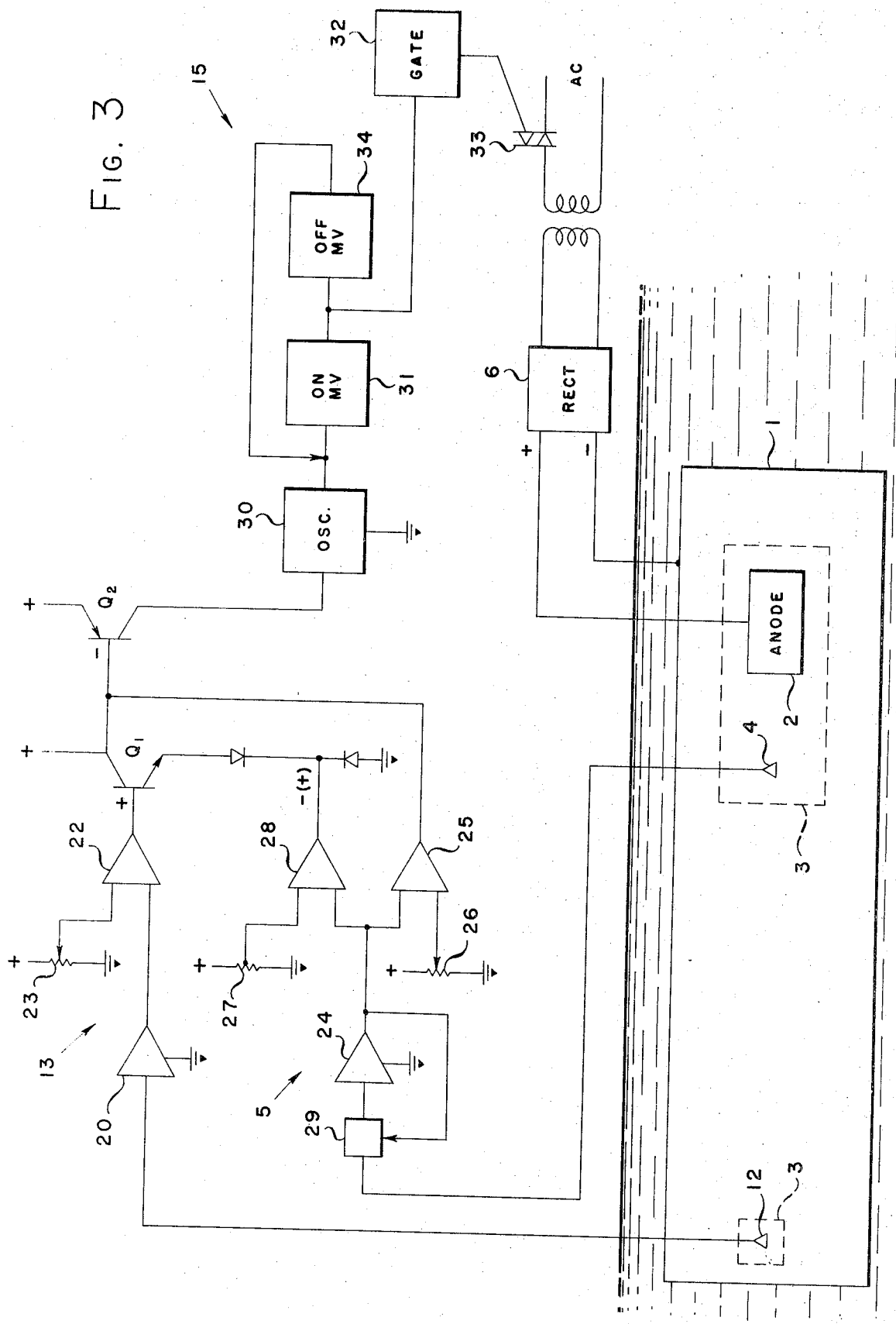
FIG. 3 is a more detailed circuit diagram of the embodiment shown in FIG. 2.

Referring now to FIG. 3, a more detailed diagram of FIG. 2 is shown. It will be apparent that the same techniques are applicable to FIG. 1. The reference cells 4 and 12, and the anodes 2 are mounted on the hull 1 and insulated therefrom as before. The remote reference cell 12 is connected to the input of amplifier 20 in the master controller 13. The output of amplifier 20 is connected to the comparator 22 where a comparison is made between the measured potential of cathode 1 and a preset potential limit for the threshold voltage required to protect the cathode 1, and is varied by the potentiometer 23, which is pre-adjusted to cover the range of 500 to 1000 millivolts. The output of comparator 22 is positive when the reference cell voltage is below the threshold setting and negative when the reference cell voltage is above the threshold setting. The output of comparator 22 is connected to the base of an NPN transistor $Q_1$.

The amplifier 24 and comparator 25 of local controller 5 are similar to those in the master controller 13 except that the output of comparator 25 is negative when the reference cell (4) potential is below the threshold setting (pot 26) and positive when the reference cell voltage exceeds the threshold setting. The output of comparator 25 is connected to the base of PNP transistor $Q_2$. The output of amplifier 24 is also compared with a fixed threshold from voltage divider 27 in the comparator 28. The fixed threshold in this case is selected as the safe limit, say 1030 millivolts. The output of comparator 28, which is positive when the reference cell (4) voltage exceeds the fixed threshold, is applied to the emitter circuit of transistor $Q_1$.

The outputs of the threshold circuits in the local (5) and master (13) controllers control the pulser 15 through the logic circuit consisting of transistors $Q_1$ and $Q_2$. Thus, when the reference cell (4) voltage is below the threshold setting in the local controller 5 (pot 26) the output of comparator 25 is negative and $Q_2$ conducts, applying voltage to oscillator 30. When the output of comparator 25 becomes zero or goes positive, indicating that the desired hull potential has been reached, $Q_2$ is cut off. Assume, now, that the remote reference cell (12) voltage is below the threshold (pot 23) in the master controller. The positive output of compartor 22 causes $Q_1$ to conduct. (The output of compartor 28 is negative.) The output of $Q_1$ pulls the base of $Q_2$ low which causes $Q_2$ to conduct. However, if the local reference cell (4) voltage exceeds the fixed threshold (pot 27), the now positive output of compartor 28 causes $Q_1$ to cut off, and $Q_2$ ceases conduction.

The conduction of $Q_2$ applies voltage to the pulse oscillator 30, which generates a series of pulses of about 5 miscroseconds duration and at about a repetition rate of 50 per second. These pulses are applied to a retriggerable monostable multivibrator 31 having an adjustable pulse width. The output pulse (ON) is applied to the gating circuit 32, which in turn applies a trigger pulse to gate a bi-directional triode thyristor (TRIAC) 33, which conducts and applies the A.C. to the rectifier 6, and the output is connected to the anode and hull. While the design of gating circuit 32 is not critical, it should trigger the TRIAC as near to the zero cross-over point of the A.C. as possible to avoid spurious noise. At the end of the pulse, TRIAC 33 ceases conduction. It will be noted that multivibrator 31 is also coupled to a second monostable multivibrator 34, which establishes the OFF time. Whereas multivibrator 31 is triggered by a positive pulse, the multivibrator 34 is triggered by a negative pulse generated at the termination of the ON pulse. The output of multivibrator 34 is fed back to the input of multivibrator 31 to inhibit triggering by the pulses from oscillator 30 during the OFF time. The ON-OFF cycle will be repeated until $Q_2$ is cut off as previously described.

Since the local reference cell 4 may be subjected to higher voltage than normal due to the fact that it is located near the anode, it is necessary to prevent this condition from interfering with the operation of the system. In such case, when the input to amplifier 24 exceeds about 1000 mv., the output can be used to control a variable impedance element 29 in the input of the amplifier 24. For example, the element 29 might be a field effect transistor (FET). A negative bias or feedback is used as a bias for the FET in which the increase of impedance in response to an increase of input signal maintains the input to the amplifier 24 substantially at 1100 mv. (1.1 volts).

While the control network has been specifically described in connection with a pulser 15, it is equally applicable to the cathodic protection of FIG. 1. Also the control network of FIG. 3, which depicts a single trigger circuit which in turn applies a burst of trigger pulses to the gate of a bi-directional triode thyristor (TRIAC) 33, which conducts and applies A.C. signal to rectifier 6, is equally applicable to a three phase ($3\phi$) system.

What is claimed is:

1. A modular cathodic protection system comprising:
   (A) a structure to be protected immersed in an electrolyte, and functioning as a cathode;
   (B) a plurality of impressed current modules located on the structure, each module consisting of:
      (1) an anode insulatingly mounted on the structure,
      (2) a rectifier power supply for providing a direct current between the anode and the structure,
      (3) a reference cell and a control circuit for sensing the polarization of the structure and controlling the rectifier;
   (C) a master control circuit coupled to each module; and
   (D) a reference cell in the electrolyte, remotely located from the modules and connected to the master control circuit;
the master control circuit responsive to the voltage of the last mentioned reference cell to provide an ON signal to each module when the reference cell voltage is below a predetermined level and an OFF signal when the reference cell voltage is above said level.

2. A cathodic protection system comprising:
   a structure to be protected located in an electrolyte, and functioning as a cathode; a plurality of impressed current modules located on the structure, each module consisting of:
      a dielectric shield mounted on the structure; an anode mounted on the dielectric shield; a power supply for providing a direct current between the anode and structure; a control circuit connected to said power supply for varying the output thereof; and a reference cell located in the electrolyte and connected to the control circuit, the cell providing a voltage indicating the condition of the structure; and
   a master control circuit coupled to each module; and a reference cell in the electrolyte, remotely located from the modules and connected to the master control circuit;
the module control circuit and the master control circuit being so arranged that the module control circuit monitors and controls the potential of the structure adjacent the modules and the master control provides over-all control.

3. A cathodic protection system comprising:
   a structure to be protected located in an electrolyte, and functioning as the cathode; a plurality of anodes in the electrolyte, and separated from the cathode by means of insulation; a plurality of power supplies, each of said power supplies being connected between an individual anode and the cathode; a plurality of controllers, each connected to one of the power supplies for controlling the output thereof; a plurality of reference cells each located in the electrolyte adjacent an anode and connected to a controller; a master controller having an output connected to each of the aforementioned controllers; and a reference cell having an output connected to the master controller and remotely located from the anodes; the system being so arranged that the controllers control the potential of the structure adjacent the modules and the master controller provides over-all control.

4. A cathodic protection system comprising:
a structure to be protected and immersed in a corrosive electrolyte; a plurality of modules each consisting of an anode, a rectifier, a controller and a reference cell adjacent the anode for providing cathodic protection adjacent said modules; and a master controller and a reference cell remote from said modules for supplying control signals to each module to provide overall protection to said structure.

5. A cathodic protection system as defined by Claim 1 and further including a control logic circuit connected between the master controller and each module, said logic circuit being responsive to the output from the master controller and the output from each module control circuit for controlling each module rectifier in accordance with a predetermined program.

6. A cathodic protection system as defined by Claim 5 and further including a pulsing network responsive to the output of the logic circuit for applying pulses to the power supply.

7. A cathodic protection as defined by Claim 6 wherein the pulses from the pulsing network are applied to a gating circuit to switch the A.C. to the rectifier on and off in response to the output of the logic circuit.

8. A cathodic protection circuit as defined by Claim 2, and wherein the outputs from each module circuit and the master control circuit are applied to a control logic circuit for controlling the module power supply.

9. A cathodic protection system as defined by Claim 4, and wherein the outputs of each module and the master controller are combined in a control logic circuit to control the rectifier of each module.

References Cited
UNITED STATES PATENTS

| | | | |
|---|---|---|---|
| 3,242,064 | 3/1966 | Byrne | 204—147 |
| 3,483,101 | 12/1969 | Delahunt et al. | 204—196 |
| 3,674,662 | 7/1972 | Haycock | 204—196 |
| 3,714,004 | 1/1973 | Riggs et al. | 204—196 |

TA-HSUNG TUNG, Primary Examiner

U.S. Cl. X.R.

204—147, 231